United States Patent
Kasami (10) Patent No.: US 7,706,251 B2
(45) Date of Patent: Apr. 27, 2010

(54) OFDM SIGNAL RECEIVING APPARATUS AND METHOD HAVING REDUCED POWER CONSUMPTION

(75) Inventor: Hideo Kasami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 502 days.

(21) Appl. No.: 11/619,385

(22) Filed: Jan. 3, 2007

(65) Prior Publication Data
US 2007/0189150 A1    Aug. 16, 2007

Related U.S. Application Data

(63) Continuation of application No. PCT/JP2006/318802, filed on Sep. 15, 2006.

(30) Foreign Application Priority Data
Feb. 16, 2006   (JP)   .............................. 2006-039881

(51) Int. Cl.
*H04J 1/00* (2006.01)
(52) U.S. Cl. ........................................ 370/208; 370/480
(58) Field of Classification Search ................ None
See application file for complete search history.

(56) References Cited

U.S. PATENT DOCUMENTS

| 6,269,132 | B1 * | 7/2001 | Yonge, III .................... 375/346 |
| 6,563,862 | B1 * | 5/2003 | Knutson et al. ............. 375/219 |
| 7,193,506 | B2 * | 3/2007 | Logvinov et al. ...... 340/310.11 |
| 7,242,252 | B2 * | 7/2007 | Taylor ........................ 330/296 |
| 7,324,437 | B1 * | 1/2008 | Czylwik et al. ............. 370/210 |
| 2005/0250452 | A1 * | 11/2005 | Walton et al. .............. 455/63.4 |
| 2006/0114814 | A1 | 6/2006 | Kasami et al. |
| 2006/0285482 | A1 | 12/2006 | Kasami et al. |

FOREIGN PATENT DOCUMENTS

| EP | 1 071 221 A1 | 1/2001 |
| JP | 2001-69023 A | 3/2001 |

OTHER PUBLICATIONS

Hideo Kasami, et al., "A filterbank based equalization technique for OFDM systems with insufficient guard interval", IEICE Society Conference 2005, Japan, B-5-71, p. 471.

* cited by examiner

*Primary Examiner*—Huy D Vu
*Assistant Examiner*—Benjamin Lamont
(74) *Attorney, Agent, or Firm*—Oblon, Spivak, McClelland, Maier & Neustadt, L.L.P.

(57) ABSTRACT

A signal receiving apparatus having both a continuous and intermittent mode for receiving OFDM signals. While in the intermittent mode, the data processing units of the apparatus receive power for a duration of time that is shorter than the duration of an OFDM symbol.

19 Claims, 10 Drawing Sheets

FIG. 17 though the whole of the transmitted data
items are needed to be received.

OFDM SIGNAL RECEIVING APPARATUS AND METHOD HAVING REDUCED POWER CONSUMPTION

CROSS-REFERENCE TO RELATED APPLICATIONS

This is a Continuation Application of PCT Application No. PCT/JP2006/318802, filed Sep. 15, 2006, which was published under PCT Article 21(2) in English.

This application is based upon and claims the benefit of priority from prior Japanese Patent Application No. 2006-039881, filed Feb. 16, 2006, the entire contents of which are incorporated herein by reference.

BACKGROUND OF THE INVENTION

1. Field of the Invention

The present invention relates to a signal receiving apparatus and method capable of reducing consumption power in receiving a radio signal.

2. Description of the Related Art

As a method for reducing consumption power of a signal receiving apparatus receiving a radio signal, a method for receiving only necessary data has been presented (for instance, JP-A 2001-69023 (KOKAI). With this method, a signal transmitting apparatus, when it transmits a plurality of data items in time-sharing, inserts information in relation to a data structure or a position of a data item to be transmitted in the head of a frame, and the signal receiving apparatus can stop a receiving operation at timing to receive unnecessary data items, so that the method enables reducing the consumption power.

However, the technique in the method only can be employed in data transmitting/receiving when the receiving apparatus selectively receives the data item transmitted from the transmission side. The technique, for instance, cannot be adapted to the case in which the whole of the transmitted data items are needed to be received.

BRIEF SUMMARY OF THE INVENTION

According to embodiments of the present invention, a signal receiving apparatus includes an antenna receiving an OFDM signal including a OFDM symbol, a first conversion unit configured to frequency-convert an OFDM signal received by the antenna, and a second conversion unit configured to analog-to-digital-convert the OFDM signal frequency-converted; sets a first section to be modulated in an interval time of the OFDM symbol and a second section that is other than the first section in the interval time; frequency-converts, by the first conversion unit, the OFDM signal received by the antenna; analog-to-digital-converts, by the second conversion unit, the OFDM signal frequency-converted; supplies power to the first and the second conversion units in the first section; and stopping supplying power to a part of the first conversion unit and a part of the second conversion unit in a second section; and demodulates the OFDM symbol which is in the first section, frequency-converted and analog-to-digital-converted.

DETAILED DESCRIPTION OF THE INVENTION

Hereinafter, a signal receiving apparatus according to embodiments of the present invention will be described with reference to the drawings. It is presumed that units with the same numbers put thereon operate in the same manner in the following embodiments then repeated descriptions will be omitted.

First Embodiment

A signal receiving apparatus in the first embodiment of the present invention will be explained. The receiving apparatus according to the first embodiment has a "continuous receiving mode" and an "intermittent receiving mode". In the "continuous receiving mode", the receiving apparatus constantly receives a radio signal to demodulate it; however in the "intermittent receiving mode", the receiving apparatus intermittently receives it to demodulate an original signal from the signal in a time section in which the signal has been received. Then, in a time section for not receiving the signal, the receiving apparatus stops power supply to a part of the receiving apparatus to reduce power consumption. The switching between the "continuous receiving mode" and the "intermittent receiving mode" is performed by a section setting unit 5 (refer to FIG. 1). A mode switching operation by the section setting unit 5 and the detail of operations of each unit in each mode will be described later.

Figure 1:
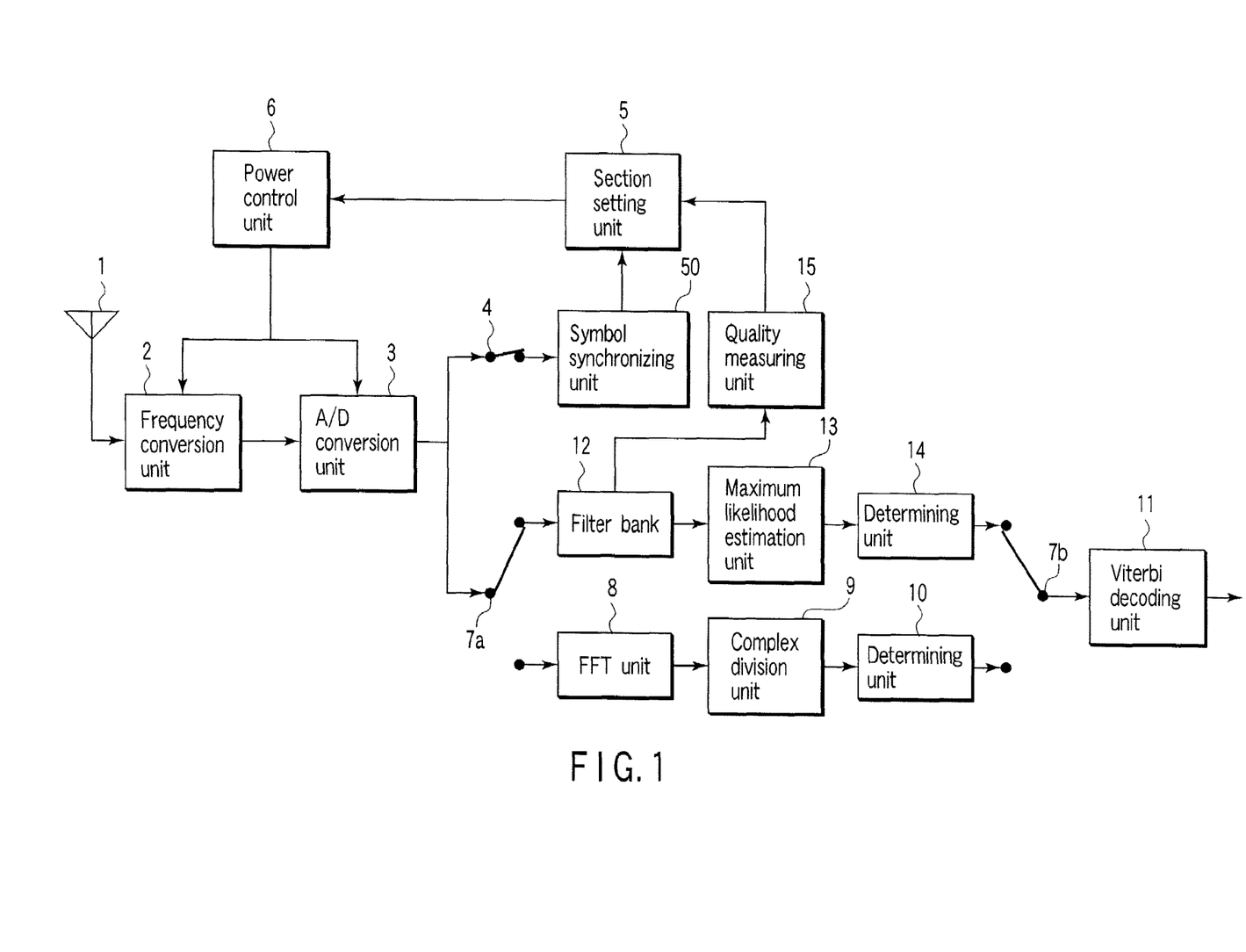
FIG. 1 is an exemplary block diagram showing a configuration of a signal receiving apparatus according to a first embodiment.

FIG. 1 the block diagram showing the configuration of the signal receiving apparatus according to the first embodiment. Hereinafter, the configuration and operations of the signal receiving apparatus according to the first embodiment will be explained with reference to the FIG. 1.

A frequency conversion unit 2 converts an OFDM signal received by an antenna 1 into an intermediate frequency (IF) signal or a base band signal, next, an analog-to-digital (A/D) conversion unit 3 converts the converted analog signal into a digital signal.

In the "continuous receiving mode", the digital signal converted by the A/D conversion unit 3 is input to a symbol synchronizing unit 50 via a switch 4. The synchronizing unit 50 synchronizes OFDM symbols to generate symbol synchronous signals.

Figure 2:
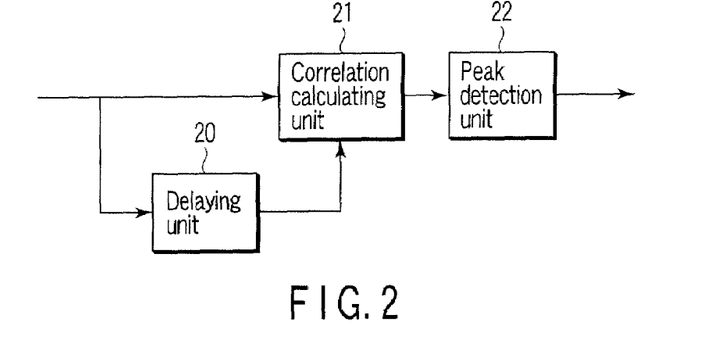
FIG. 2 is an exemplary block diagram showing a configuration of a symbol synchronizing unit according to the first embodiment.

FIG. 2 shows the configuration of the synchronizing unit 50. The synchronizing unit 50 generates a symbol synchronous signal by using the received signal at least in one OFDM symbol interval time. That is, a delay unit 20 delays the received signal by an effective symbol time section and a correlation calculating unit 21 calculates correlation values between the received signal and delayed signal. Each correlation value is calculated every time point by using a signal in a time section that is from the time point to a past time point prior to the time point by time section of the same long as a guard interval (GI) of the OFDM signal.

Figure 3:
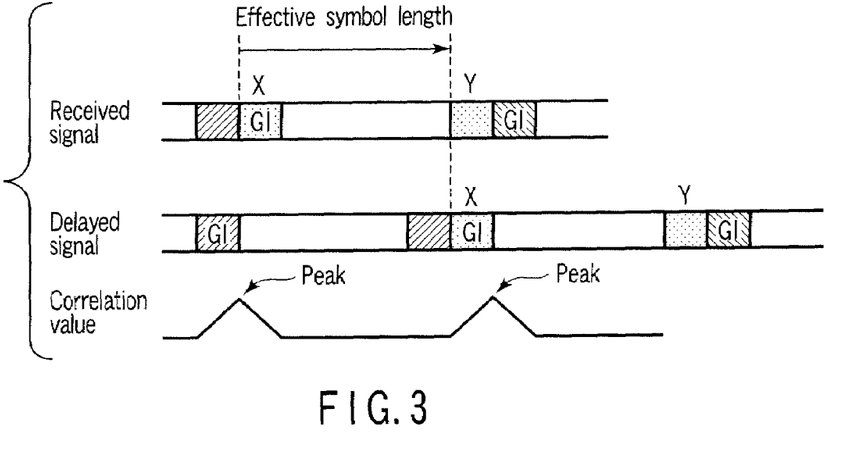
FIG. 3 is an exemplary view showing a method of symbol synchronization according to the first embodiment.

Here, one OFDM symbol includes the GI (section of "X" in FIG. 3) and a section (section of "Y" in FIG. 3) with the same data as that in the GI included therein. Accordingly, the correlation value between the received signal and the delayed signal includes periodical peaks as shown in FIG. 3. By detecting the peak through a peak detection unit 22, the receiving apparatus can recognize the head position of each OFDM symbol. The peak detection unit 22 generates the symbol synchronous signal by using the detected peaks. The symbol synchronization described above is performed in the "continuous receiving mode" and is not performed in the "intermittent receiving mode".

Figure 4:
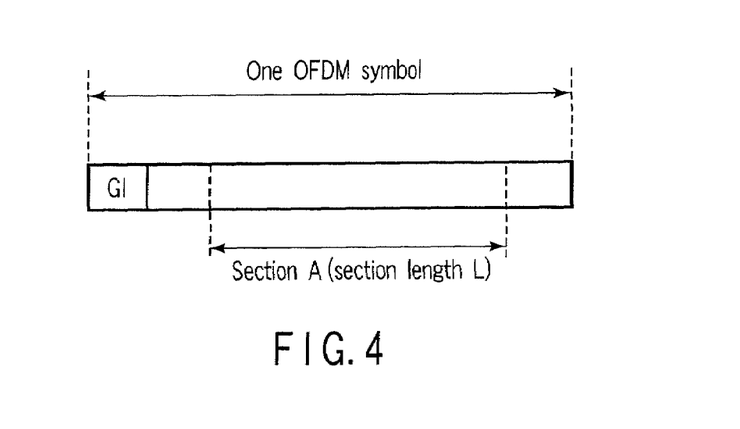
FIG. 4 is an exemplary view showing a signal receiving section in one OFDM symbol according to the first embodiment.

The section setting unit 5, as shown in FIG. 4, sets a section "A" to be received in the interval time of the OFDM symbol (or OFDM symbol section) on the basis of the symbol synchronous signal generated by the synchronizing unit 50. A section length "L" of the section "A" is set so as to become not less than ½ of the section of one OFDM symbol section with the exception of a GI section. This is because the signal demodulation processing described below demodulates the OFDM signal by using the signal in the section of ½ of the effective symbol length. A section setting method will be described later.

The section setting unit 5 also performs switching between the "continuous receiving mode" in which OFDM signals are receiving continuously and the "intermittent receiving mode" in which OFDM signals are receiving intermittently.

In the "continuous receiving mode", a power control unit 6 always sets the frequency conversion unit 2 and the A/D conversion unit 3 on (state to be supplied power). A switch 4 is then closed and the synchronizing unit 50 continuously updates the symbol synchronization and the section setting unit 5 continuously updates setting of the section "A".

At this time, a switch 7 is connected to a side of an FFT unit 8. That is, a signal output from the A/D conversion unit 3 is input to the FFT unit 8 and the FFT unit 8 converts the signal in the effective symbol section into a signal in a frequency domain. The output signal from the FFT unit 8 is next input to a complex division unit 9. The complex division unit 9 executes one tap equalization processing on the input signal using a channel estimation value. After bit determination processing by a determining unit 10, a Viterbi decoding unit 11 performs error correction processing to demodulate the original signal.

On the other hand, in the "intermittent receiving mode", (a) in the section "A", the power control unit 6 set the power supply to the frequency conversion unit 2 and the A/D conversion unit 3 (or the power control unit 6 supplies power to the frequency conversion unit 2 and the A/D conversion unit 3) to receive the OFDM signal; however, (b) in the section other than the section "A", the power control unit 6 sets the power supply to at least a part of the frequency conversion units 2 and the A/D conversion unit 3 off to stop receiving the OFDM signal.

Figure 5:
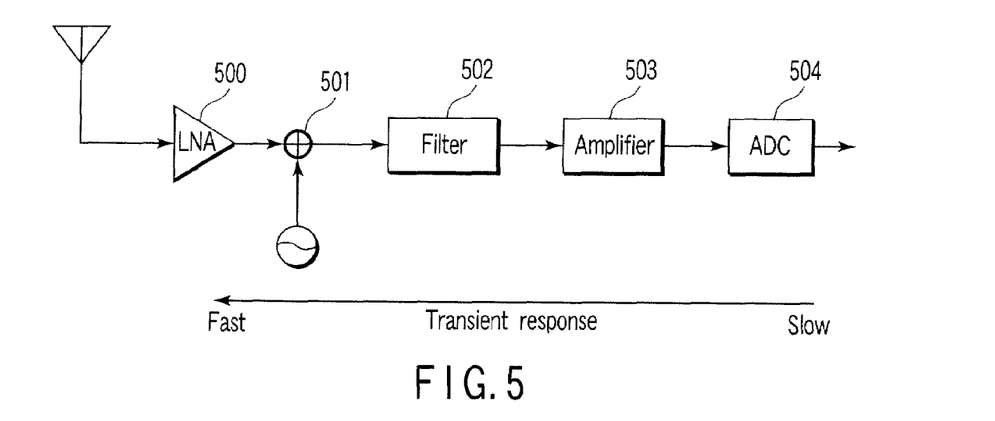
FIG. 5 is an exemplary view for explaining a speed of a transient response of a constituent element according to the first embodiment.

In general, as shown in FIG. 5, a frequency of a signal processed is higher, the transient response of the device wherein the signal is processed is faster, so that the time period that the power supply to be "off" becomes longer. For instance, transient responses of a low noise amplifier (LNA) 500 and a mixer 501 for an RF band are faster and a transient response of an amplifier 503 for a base band is lower. Therefore, for example, the power control unit 6 supplies power to the LNA included in the frequency conversion unit 2 only in the section "A", and in the section other than the section "A", the power control unit 6 stop supplying power thereto. With constant power supply to the devices (amplifier, etc.) other than the LAN regardless of the section set by the section setting unit 5, the power consumption in the LNA can be reduced and the operations of the signal receiving apparatus can be prevented from becoming unstable due to the delay of the transient response accompanying the switching of the power supply.

Figure 6:
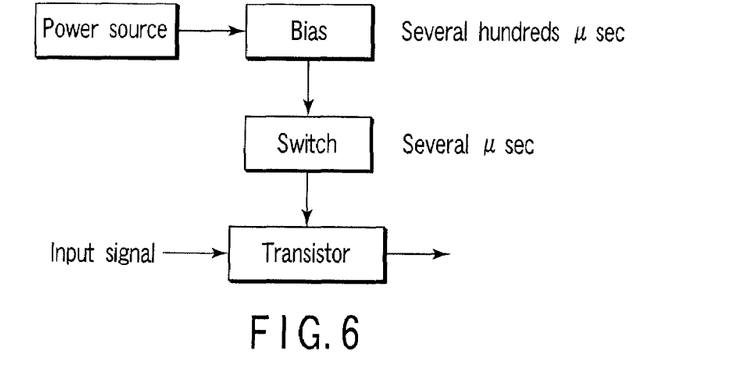
FIG. 6 is an exemplary view showing a control method of power supply according to the first embodiment.

Since the transient response of a bias circuit is slow (several hundreds μ sec order), the power may be supplied constantly to the bias circuits of the frequency conversion unit 2 and A/D conversion unit 3 and also in the section other than the section "A", the power supply to each transistor circuit thereof may be stopped. In this case, as shown in FIG. 6, it is preferable to switch the power supply to the transistor circuit on and off by controlling the switch that is for switching the connection between the bias circuit and the transistor circuit.

The receiving apparatus then reduces interference among OFDM sub-carriers from the OFDM signal received in the section "A" to demodulate the original signal.

Figure 7:
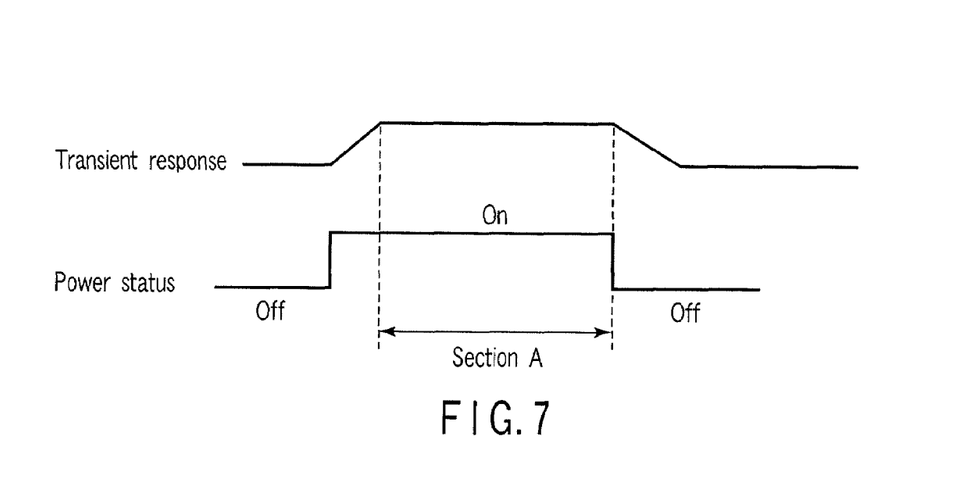
FIG. 7 is an exemplary view showing a control method of power supply according to the first embodiment.

In consideration of transient response properties of analog units (frequency conversion unit 2 and A/D conversion unit 3, etc.), it is preferable for the switch-over of power supply control by the power control unit 6, as shown in FIG. 7, to be performed at timing earlier than the start of the section "A". The receiving apparatus automatically measures the transient response properties of the analog units when the power source of the receiving apparatus is turned on and to set timing to turn on the power source thereof on the basis of the measured transient response properties.

In the "intermittent receiving mode", the switch 4 is released and the symbol synchronization in the symbol synchronizing unit 50 and section setting in the section setting unit 5 are not performed.

Figure 8:
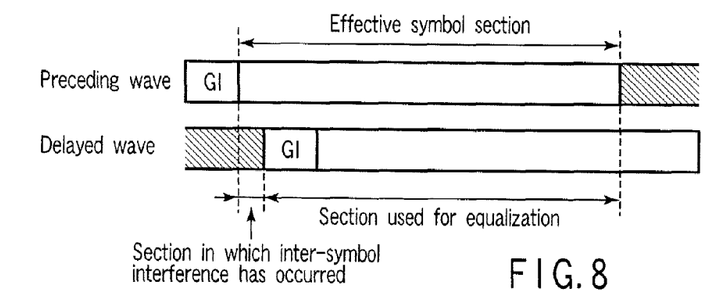
FIG. 8 is an exemplary view showing an example of a demodulating method of an original signal from a part of an OFDM symbol.

Here, to demodulate the original signal by using a part of an OFDM symbol, for instance, a method described in a document of "Examination of adaptive equalization method using filtering for multipath delay exceeding guard interval in OFDM" (Kasami, et al., 2005, Electronic Information Communication Conference Society Congress, B-5-71) is available. However, in the method described in the given document, as shown in FIG. 8, it is supposed a transmission environment in which a delayed wave exceeds a guard interval of the preceding wave. And the method differs from this first embodiment of the present invention in the point that the method utilizes the section, in which the interference from the former symbol due to the delayed wave is not appeared in the effective symbol section, for equalization.

Hereinafter, a method for demodulating the OFDM symbols from signal corresponding to a part of the OFDM symbol section will be explained shortly.

The switch 7a is connected to a side of a filter bank 12. The filter bank 12 extracts the section of a ½ length of an effective symbol length from the section "A" and frequency-converts the signal included in the extracted section. Next, a maximum likelihood estimation unit 13 generates a plurality of replicas every output from the filter bank 12, from channel estimation value, frequency characteristics of the filter bank 12 and candidates of modulation signals for the sub-carriers. And the estimation unit 13 selects, every output from the filter bank 12, a replica minimizing error between the output and the replicas. Furthermore, from the selected replicas, the estimation unit 13 selects the modulation signal for the sub-carrier. When the estimation unit 13 selects the modulation signal of the sub-carrier, a determining unit 14 performs bit determination processing, and the Viterbi decoding unit 11 performs error correction processing to demodulate the original signal.

Figure 9:
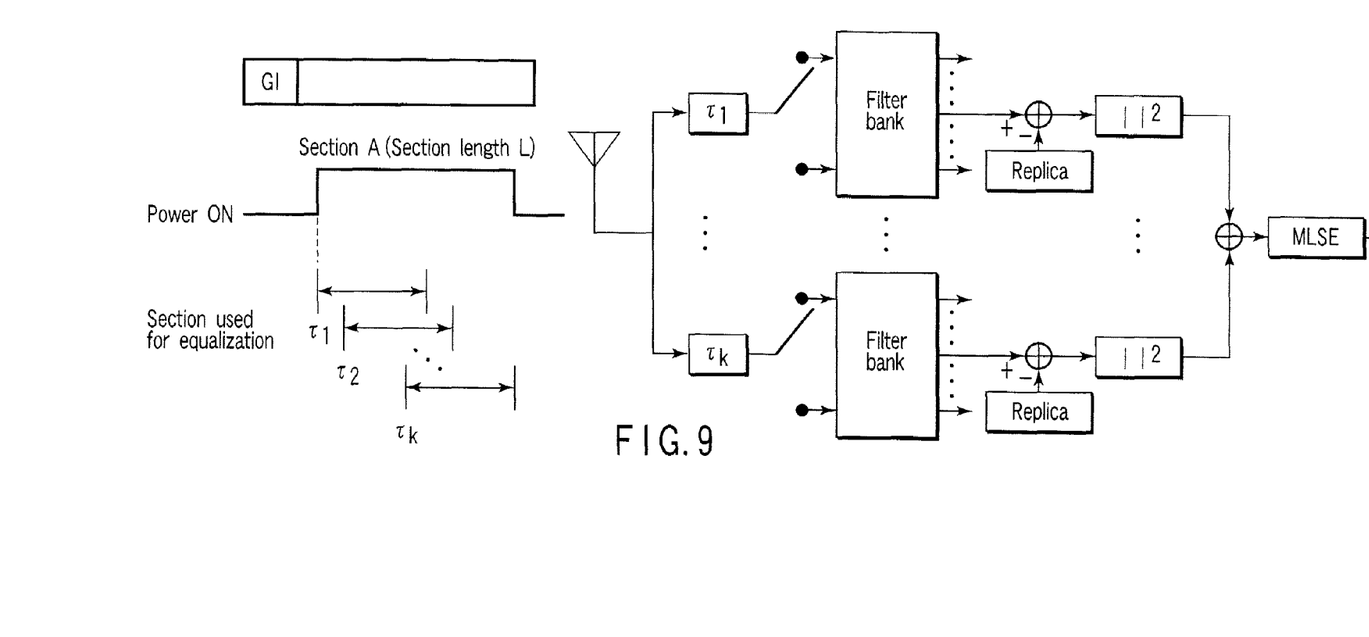
FIG. 9 is an exemplary view showing an example of a demodulating method of an original signal according to the first embodiment.

The case described above, the filter bank 12 extracts only one section from the section "A" and frequency-converts the signal included therein; however, the present invention is not limited to this case, as shown in FIG. 9, the filter bank 12 may extract a plurality of sections of ½ length of the effective symbol length from the section "A" while staggering times ($\tau_1, \tau_2, \ldots, \tau_k$) And the estimation unit 13 calculates, every extracted section, an error between the output from the filter bank 12 and each of the replicas to select a replica from the replicas so as to minimize the average of the errors.

As mentioned above, in the "intermittent receiving mode", by demodulating the original signal from the section "A" that is a partial OFDM symbol and by stopping the receiving operations of the signals in the section other than the section "A", it becomes possible for the receiving apparatus to reduce the consumption of the power in the section other than the section "A". Here, since the consumption power at the frequency conversion units 2 and A/D conversion unit 3 is about 10 times of the consumption power of each of other units processing the digital signals and it amounts to almost all parts of the whole consumption power of the receiving apparatus, the receiving apparatus can reduce its consumption power dramatically by performing such intermittent receiving operations.

Figure 10:
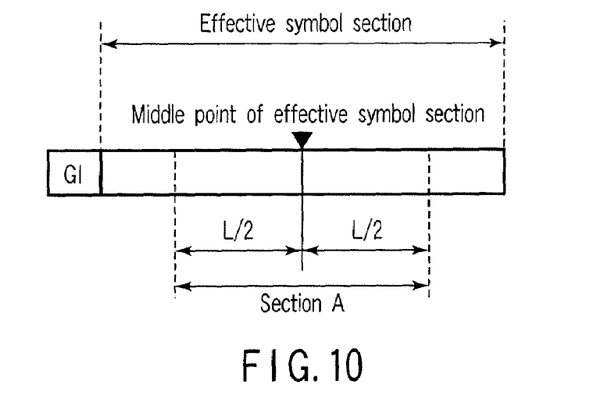
FIG. 10 is an exemplary view showing an example of setting a signal receiving section according to the first embodiment.

Next to this, the section setting method by the section setting unit 5 will be explained by referring to FIG. 10.

The section setting unit 5 sets the section "A" in the OFDM symbol section, the length the section "A" is "L" and the section "A" includes the middle point of the OFDM symbol section except the GI section, based on the symbol synchronization signals. For instance, as shown in FIG. 10, the section setting unit 5 sets the section "A" having a center at the middle of the OFDM symbol section except the GI section and including sections of length "L/2" around the center. Like this way, by positioning the section "A" at the central part of OFDM symbol section except the GI section, even when variations of the transmission environment causes a synchronous deviation in the symbol synchronization after the symbol synchronization was established once, the OFDM symbol is hardly affected by the symbols transmitted before and after the OFDM symbol. Therefore, the receiving apparatus becomes possible to avoid an occurrence of inter-symbol interference caused by the synchronous deviation.

Figure 11:
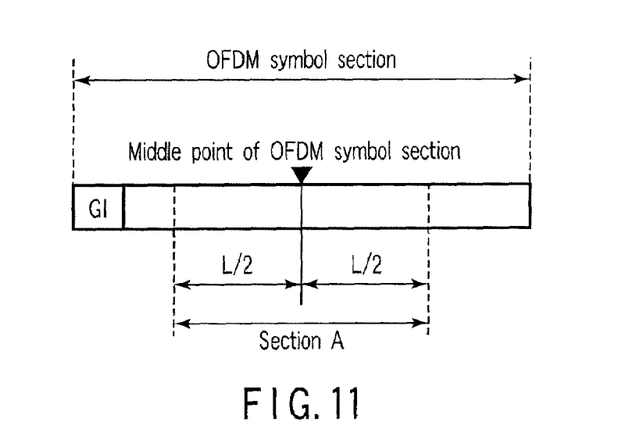
FIG. 11 is an exemplary view showing another example of setting the signal receiving section according to the first embodiment.

FIG. 11 is a view showing another section setting method by the section setting unit 5.

In the example shown in FIG. 11, the section setting unit 5 sets the section "A" in the OFDM symbol section, the middle point of the section "A" is identical to the middle point of the OFDM symbol section in which the GI section is included and the section "A" includes sections of length "L/2" around the middle point of the section "A". By setting in such a manner, the section setting unit 5 specifically enables avoiding an occurrence of interference by the symbol transmitted after the OFDM symbol in the transmission environment with the short delay time of the delayed wave.

Figure 12:
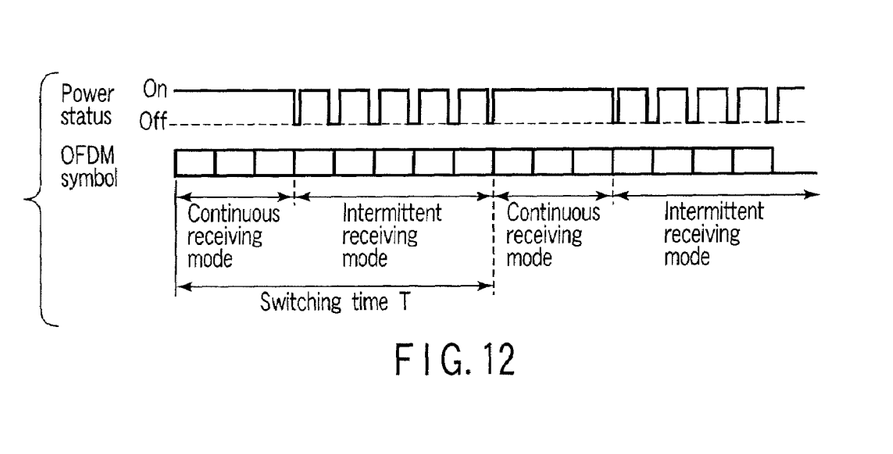
FIG. 12 is an exemplary view showing a method of mode switching according to the first embodiment.

Successively, we will explain the method of the mode switching in the section setting unit 5.

The section setting unit 5 switches between the "intermittent receiving mode" and the "continuous receiving mode" at every given time period "T". As described above, in the "continuous receiving mode", the symbol synchronizing unit 50 performs the symbol synchronization. Therefore, even if the symbol synchronization is deviated due to the variation of the transmission environment or the like, the synchronizing unit 50 enables performing periodic symbol synchronization in the "continuous receiving mode" by periodically switching between the "continuous receiving mode" and the "intermittent receiving mode". It is advisable to set a large value of the time "T" switching between the "continuous receiving mode" and the "intermittent receiving mode" because an effect of the reduction in the power consumption in the "intermittent receiving mode" can be lasted for a long time.

It is preferable for the section setting unit 5 to set the time "T" that is for switching between the "intermittent receiving mode" and the "continuous receiving mode" and to set the section length of the section "A" that is for receiving the signal in the "intermittent receiving mode" based on the quality of the received OFDM signal that is measured by a quality measuring unit 15. Hereinafter, operations of the quality measuring unit 15 and operations of the setting unit 15 based on the quality information measured by the measuring unit 15 will be described.

The measuring unit 15 measures the quality of the received OFDM signal to obtain the quality information, and sends the quality information to the setting unit 5. Here, receiving power and an error value magnitude (EVM) of the demodulated signal, and likelihood of the maximum likelihood estimation, etc., are utilized as a signal quality. The quality information sent from the quality measuring unit 15 is input to the section setting unit 5 and reflected to the time "T" that is for the mode switching. More specifically, if the signal quality input from the quality measuring unit 15 is low, the time "T" that is for the mode switching is set to a small value and the symbol synchronization in the "continuous receiving mode" is repeated frequently so as to avoid deterioration in the signal quality. If the signal quality is low, the section length "L" may be set to a large value. Thereby, the ability of reducing the interference among the OFDM sub-carriers becomes high, so that the improvement of the signal quality is achieved.

In the embodiment described above, the case where the power supply to the frequency conversion unit 2 and the A/D conversion unit 3 is suspended in the sections other than the section "A" is explained, it is also possible to reduce the power consumption even in the units (for instance, filter bank 12, maximum likelihood estimation unit 13, and the like)

processing the digital signal by suspending the power supply after completing demodulation processing.

Figure 13:
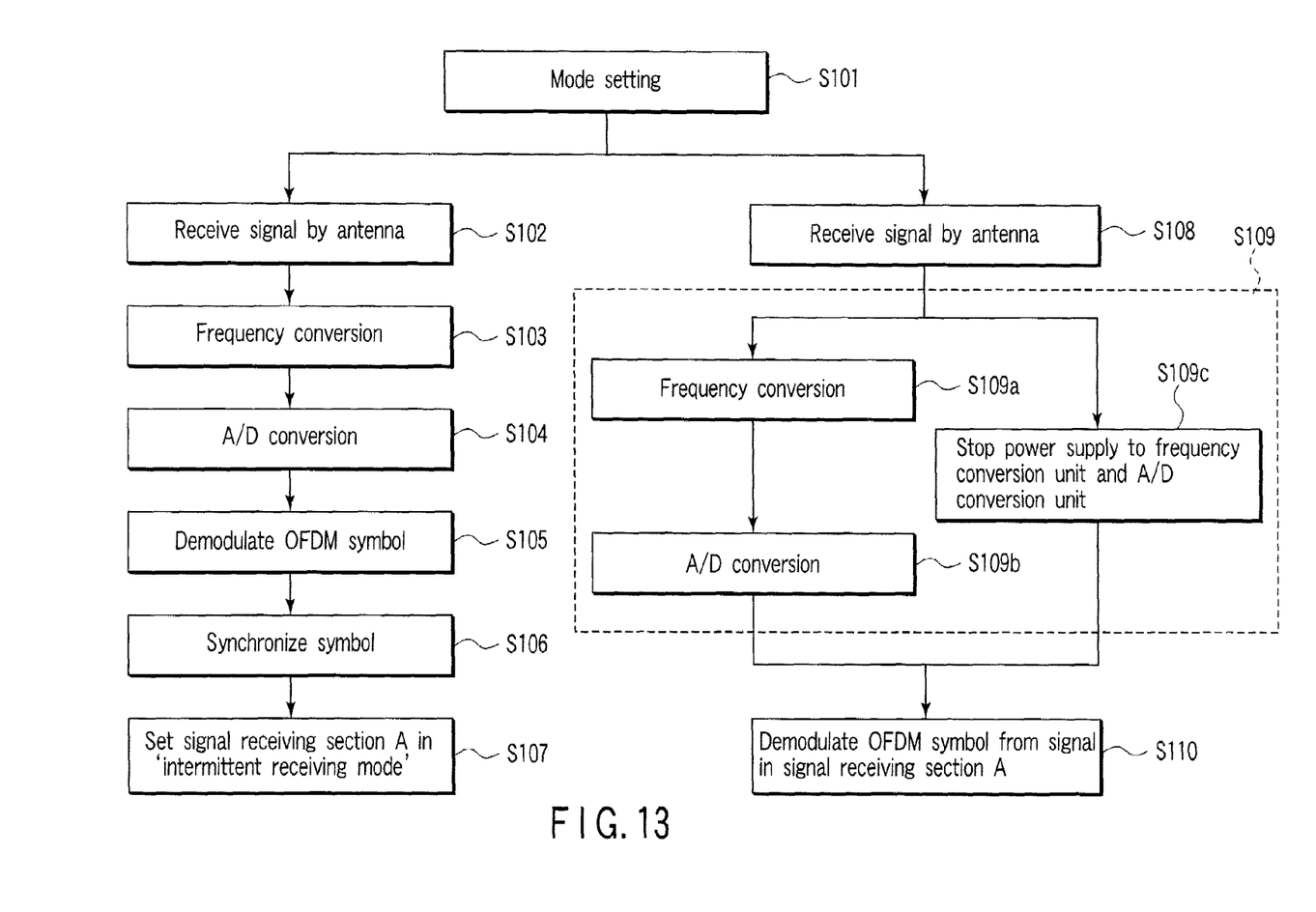
FIG. 13 is an exemplary flowchart showing operations of the first embodiment.

Lastly, the flow of operations of the signal receiving apparatus regarding the first embodiment is explained by referring to FIG. 13.

The section setting unit 5 sets the "continuous receiving mode" and the "intermittent receiving mode" (step S101). At a stage of starting signal reception, the symbol synchronization is required firstly, so the section setting unit 5 sets the mode to the "continuous receiving mode".

When the mode is sets to the "continuous receiving mode", the antenna 1 receive the OFDM signal (step S102), and the antenna 1 sends the received signal to the frequency conversion unit 2 and the A/D conversion unit 3. In the "continuous receiving mode", as the power control unit 6 supplies power to the frequency conversion units 2 and A/D conversion unit 3, the received signal is frequency-converted (step S103) and digitized (analog-to-digital (A/D)-converted) (step S104).

The signal digitized (A/D-converted) by the A/D conversion unit 3 are demodulated to the original signal through the FFT unit 8, the complex division unit 9, the determining unit 10 and the Viterbi decoding unit 11 (step S105).

And the signal digitized by the A/D conversion unit 3 is also sent to the symbol synchronizing unit 50 separately to be symbol-synchronized (step S106). The setting unit 5 sets the section "A" that is for receiving the signal in the "intermittent receiving mode" on the basis of the symbol-synchronized signal (step S107).

When a predetermined time period is elapsed, the section setting unit 5 switches the mode from the "continuous receiving mode" to the "intermittent receiving mode" (step S101).

In the "intermittent receiving mode", the power control unit 6 controls the power supply to the frequency conversion unit 2 and the A/D conversion unit 3. That is, in the section "A" that is for receiving the signal, the power control unit 6 supplies the power to the frequency conversion units 2 and the A/D conversion unit 3 to perform the frequency conversion (step S109a) and the analog-to-digital (A/D) conversion (step 109b) of the signal received by the antenna 1 (step S108). On the contrast, in the section that is for stopping the receiving the signal (the section other than the section "A"), the power control unit 6 stops or suspends the power supply to the frequency conversion units 2 and the A/D conversion unit 3 (step S109c).

The demodulation of the signal in the "intermittent receiving mode" is performed though the filter bank 12, the maximum likelihood estimation unit 13, the determining unit 14 and the Viterbi decoding unit 11 by using the signal received in the section "A" (step S110).

Furthermore, when the predetermined time period is elapsed, the section setting section 5 switches the mode from the "intermittent receiving mode" to the "continuous receiving mode" to repeat the above-mentioned operations.

That is the flow of the operations of the signal receiving apparatus regarding the first embodiment of the present invention.

This signal receiving apparatus can be also realize by utilizing, for example, a multipurpose computer device as basic hardware. The section setting unit 5, power control unit 6, FFT unit 8, complex division unit 9, determining units 10 and 14, Viterbi coding unit 11, filter bank 12, maximum likelihood estimation unit 13, quality measuring unit 15 and symbol synchronizing unit 50 can be realized by making a processor mounted on the computer device run a program. At this time, the receiving apparatus may realize by installing the program to the computer device in advance or by recording the program on a recording medium such as a CD-ROM or distributing the program via a network to appropriately install it to the computer device.

According to the embodiment described above, the signal receiving apparatus can reduced power consumption by receiving an orthogonal frequency division multiplexing (OFDM) signal corresponding to a part of a section of an OFDM symbol to demodulate an original symbol and by stopping receiving signal in a section in which the OFDM signal is not received.

Second Embodiment

A signal receiving apparatus regarding a second embodiment of the present invention will be described.

Figure 14:
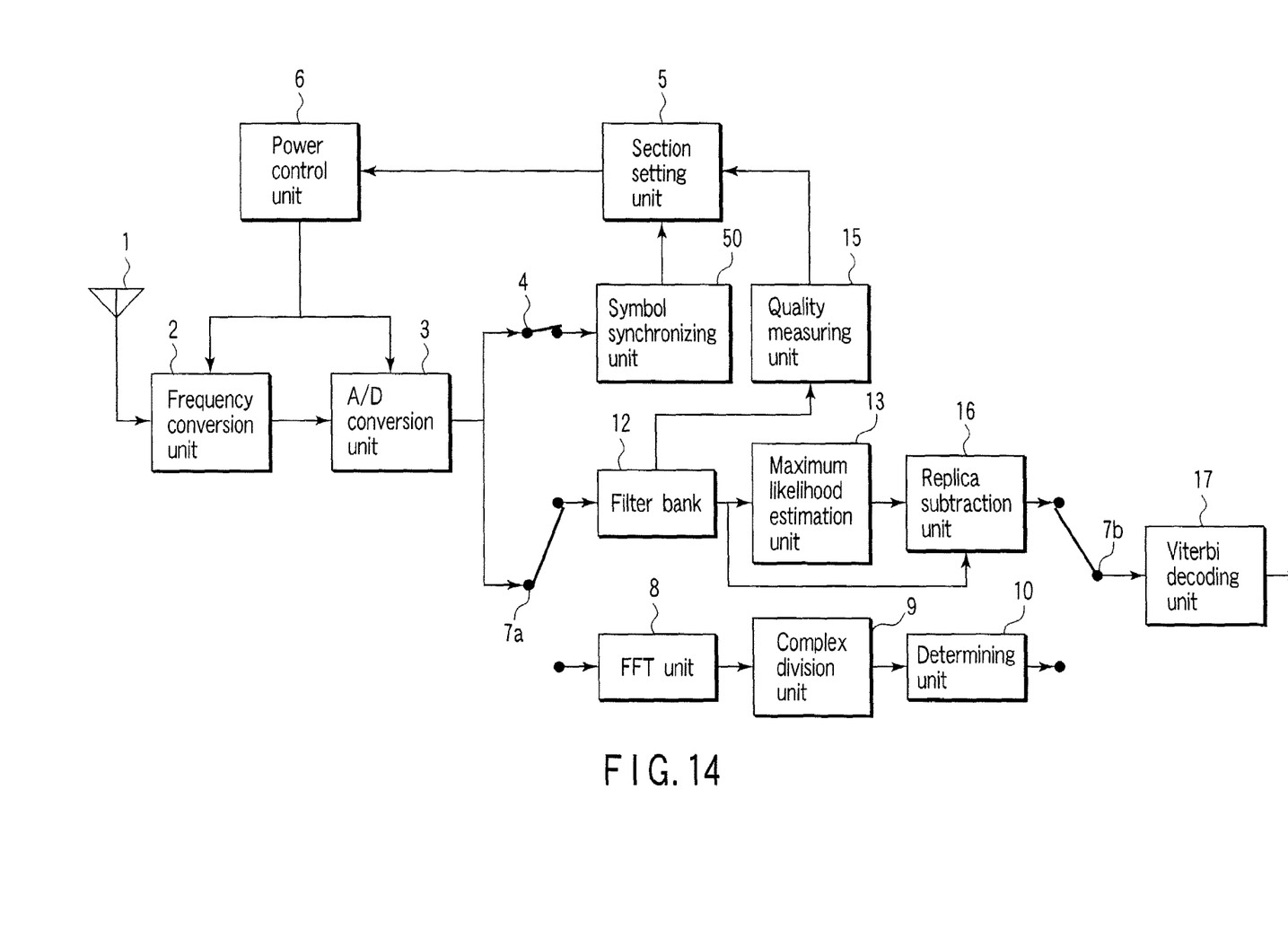
FIG. 14 is an exemplary block diagram showing a configuration of a signal receiving apparatus according to a second embodiment.

FIG. 14 is the block diagram showing the configuration of the receiving apparatus regarding the second embodiment. The second embodiment differs from the first embodiment in a replica subtracting unit 16 and a Viterbi coding unit 17.

In the "intermittent receiving mode", the replica subtracting unit 16 subtracts, from an output from the filter bank 12, a remaining replica component which are obtained by removing the component corresponding to a sub-carrier of an object to be demodulated from a replica selected every output from the filter bank 12 by the maximum likelihood estimation unit 13. Thereby, a soft-decision value in which the interference among OFDM sub-carriers is reduced is generated. The soft-decision value is input to the Viterbi decoding unit 17 then the Viterbi coding unit 17 performs soft determination Viterbi coding processing.

Since the receiving apparatus regarding the second embodiment performs the soft determination vitervi decoding processing, the receiving apparatus calculates path metrics of Viterbi decoding on the ground of affection of noise. Therefore, signal receiving performance of the receiving apparatus is improved.

Third Embodiment

A signal receiving apparatus regarding a third embodiment of the present invention will be explained.

Figure 15:
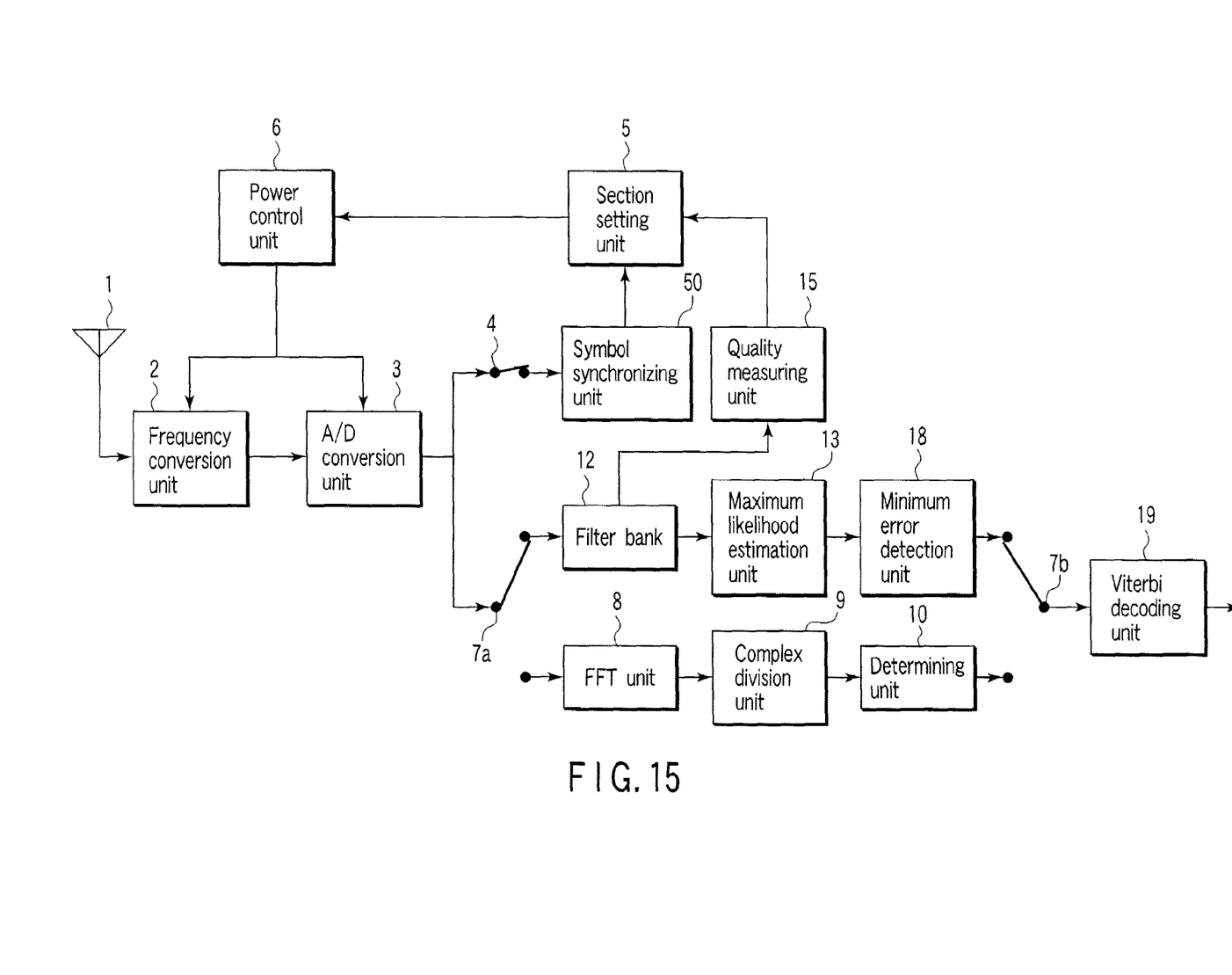
FIG. 15 is an exemplary block diagram showing a configuration of a signal receiving apparatus according to a third embodiment.

FIG. 15 is the block diagram showing the configuration of the receiving apparatus regarding the third embodiment. The third embodiment differs from the first embodiment in a minimum error detection unit 18 and a Viterbi decoding unit 19.

In the "intermittent receiving mode", the minimum error detection unit 18 detects a minimum error for each candidate of modulation signals for sub-carriers to be demodulated from the errors calculated by the maximum likelihood estimation unit 13. Thereby, metric for each candidate of the modulation signals are generated. The metric are input to the Viterbi decoding unit 19, and then the Viterbi decoding unit 19 performs Viterbi decoding processing by giving consideration to likelihood.

Like this, since the receiving apparatus regarding the third embodiment performs the Viterbi decoding processing taking the likelihood into account, the receiving apparatus decrease the affection of data with less reliability in calculating the path metric of the Viterbi decoding and improve the signal receiving performance.

Fourth Embodiment

A signal receiving apparatus regarding a fourth embodiment will be explained hereinafter.

Figure 16:
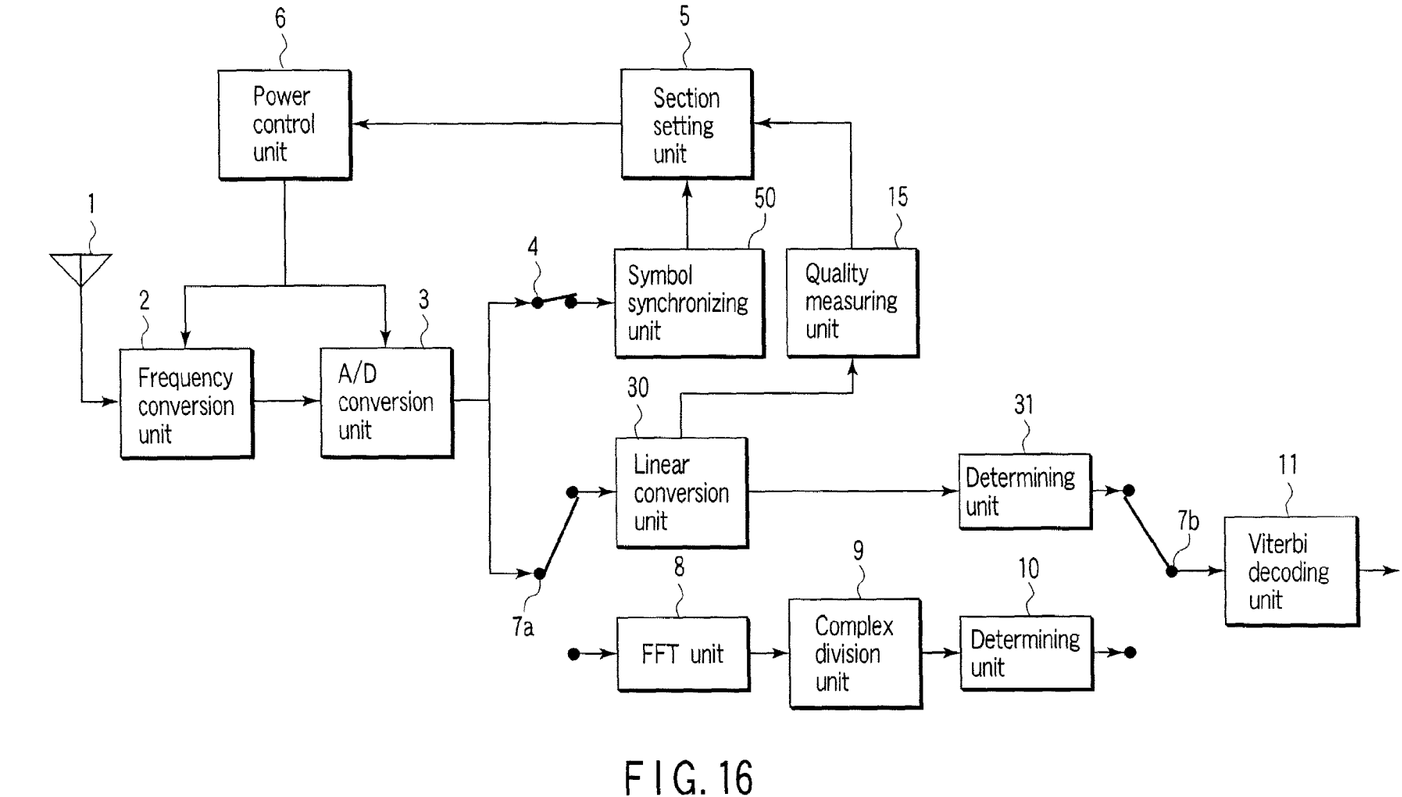
FIG. 16 is an exemplary block diagram showing a configuration of a signal receiving apparatus according to a fourth embodiment.

FIG. 16 is the block diagram showing the configuration of the receiving apparatus regarding the fourth apparatus. The forth embodiment differs from the first embodiment in a linear conversion unit 30 and a determining unit 31.

In the "intermittent receiving mode", the received signals in the section "A" (section length "L") set by the section setting unit 5 is input to the linear conversion unit 30, and then the linear conversion unit 30 performs linear conversion processing. Hereinafter, an example of linear conversion processing will be shown.

If an effective symbol length is set to N and the number of data sub-carriers is set to M, transmission signals s(n) (n=0, 1, ..., L−1) corresponding to the section "A" (section length "L") in an effective symbol section of the OFDM signal are given by expression (1). Here, the section length "L" is set so as to satisfy N>L≧M.

$$\begin{bmatrix} s(0) \\ s(1) \\ \vdots \\ s(L-1) \end{bmatrix} = \frac{1}{N} \begin{bmatrix} 1 & 1 & \cdots & 1 \\ 1 & \exp\left(j\frac{2\pi}{N}\right) & \cdots & \exp\left(j\frac{2\pi(M-1)}{N}\right) \\ \vdots & \vdots & \ddots & \vdots \\ 1 & \exp\left(j\frac{2\pi(L-1)}{N}\right) & \cdots & \exp\left(j\frac{2\pi(M-1)(L-1)}{N}\right) \end{bmatrix} \begin{bmatrix} x(0) \\ x(1) \\ \vdots \\ x(M-1) \end{bmatrix} \quad (1)$$

where x(k) indicates mapping point on an IQ constellation, and x(k) corresponding to sub-carriers (k=M, M+1, ..., N−1) to which data is not assigned is expressed by x(k)=0.

The matrix expression of expression (1) is given by $$S = A \cdot X \quad (2)$$

Here, a linear matrix for a linear conversion regarding the fourth embodiment is given by expression (3).

$$B = ((A \cdot E\{X \cdot X^H\} \cdot A^H + p_n I)^{-1} \cdot A \cdot E\{X \cdot X^H\})^H \quad (3)$$

In expression (3), H is a complex conjugate transposition, E{•} is an expectation, I is a unit matrix. And $p_n$ is a presumed noise power.

Wherein if it is supposed that x(0), x(1), ..., x(M−1) have no correlation one another, and that an averaged power of transmission signals is $p_s$, expression (4) is obtained.

$$B = ((p_s A \cdot A^H + p_n I)^{-1} \cdot p_s A)^H \quad (4)$$

Furthermore, if it is presumed that $p_s=1$, $p_n=0$, expression (5) is obtained.

$$B = ((A \cdot A^H)^{-1} \cdot A)^H \quad (5)$$

Here, the linear conversion performed by the linear conversion unit 30 is given as expression (6) by using the linear matrix B. Where, y(n) (n=0, 1, ..., L−1) is received signal corresponding to the transmission signals s(n) and x'(n) (n=0, 1, ..., M−1) is estimated value corresponding to a sub-carrier demodulation signal x(n) on the transmission side.

$$\begin{bmatrix} x'(0) \\ x'(1) \\ \vdots \\ x'(M-1) \end{bmatrix} = B \cdot \begin{bmatrix} y(0) \\ y(1) \\ \vdots \\ y(L-1) \end{bmatrix} \quad (6)$$

In this way, the linear conversion unit 30 performs the linear conversion processing given by expression (6) and the liner-converted signals are input to the determining unit 31.

The determining unit 31 performs bit determination processing and the signals after the bit determination processing are input to the Viterbi decoding unit 11 to be decoded.

Like this manner, the receiving apparatus regarding the fourth embodiment linear-converts the received signal to demodulate it. Then, the receiving apparatus performs processing corresponding to usual FFT processing by using the received signal in the section "A", and extracts frequency components of the received signal. As a result, the receiving apparatus can reduce a calculation amount for demodulation.

Fifth Embodiment

A signal receiving apparatus regarding a fifth embodiment will be described.

Figure 17:
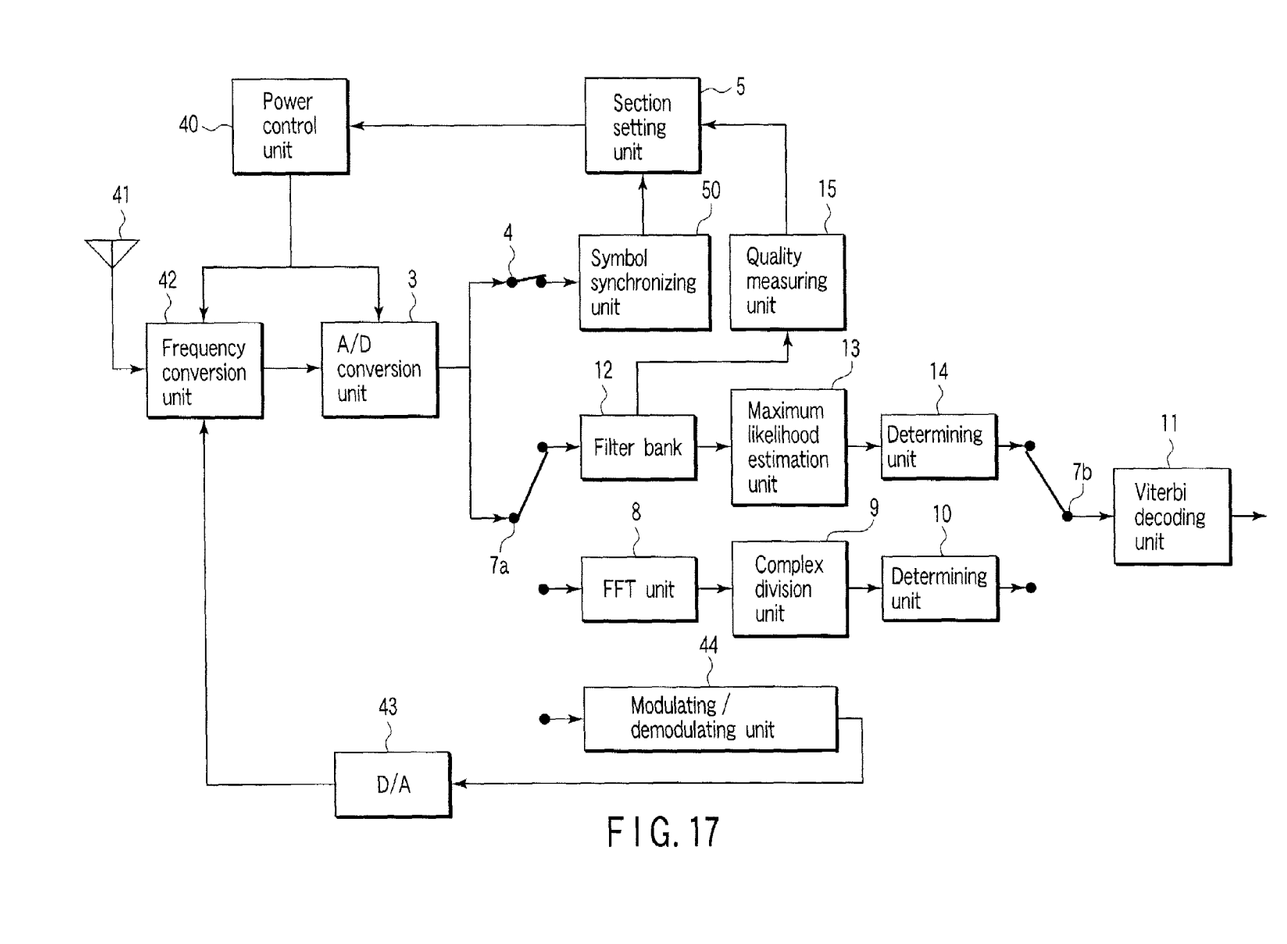
FIG. 17 is an exemplary block diagram showing a configuration of a signal receiving apparatus according to a fifth embodiment.

FIG. 17 is the block diagram showing the configuration of the signal receiving apparatus regarding the fifth embodiment. The fifth embodiment differs from the first embodiment in a power control unit 40, an antenna 41, a frequency conversion unit 42, an analog-to-digital (A/D) conversion unit 43 and a modulating/demodulating unit 44 that is for transmitting/receiving a signal against other radio communication system.

In the fifth embodiment, in the "intermittent receiving mode", the receiving apparatus transmits or receives data against other radio communication system in the section other than the section "A". That is, in the section other than the section "A", the antenna 41 and the frequency conversion unit 42 are set a frequency band of sub-carrier of the OFDM signal transmitted/received to/from other radio communication system. In the section other than the section "A", when the receiving apparatus receives OFDM signal transmitted from other radio communication system, the signal in the frequency band set for the antenna 41 is received. The received signal is sent to the modulating/demodulating unit 44 via the switch 7a through the frequency conversion unit 42 and the A/D conversion unit 3. In contrast, when the receiving apparatus transmits the OFDM signal to other radio communication system in the section other than the section "A", the signal outputted from the modulating/demodulating unit 44 is converted into an analog signal by the D/A conversion unit 43, and frequency-converted by the frequency conversion unit 42 to be transmitted from the antenna 41.

The power control unit 40, when the receiving apparatus transmits/receives the data to/from other radio communication system in the section other than the section "A" as mentioned above, continues supplying power to the frequency conversion units 42 and the A/D conversion unit 3. On the other hand, when the receiving apparatus does not transmit/receive the data to/from other radio communication system in the section other than the section "A", the receiving apparatus stops supplying the power to the frequency conversion units 42 and the A/D conversion unit 3 so as to reduce the power consumption.

According to the receiving apparatus regarding the fifth embodiment, since the antenna 41, frequency conversion unit 42 and A/D conversion unit 3 can be shared by different systems, power consumption can be reduced and also a radio communication system can be achieved at low cost.

What is claimed is:

1. A signal receiving apparatus, comprising:
   an antenna receiving an orthogonal frequency division multiplex (OFDM) signal including an OFDM symbol;
   a section setting unit configured to set a first section to be demodulated in an interval time of the OFDM symbol and a second section that is other than the first section in the interval time of the OFDM symbol, wherein a length of the first section is shorter than the interval time of the OFDM symbol;
   a first conversion unit configured to frequency-convert the OFDM signal received by the antenna;
   a second conversion unit configured to analog-to-digital-convert the OFDM signal frequency-converted;
   a first demodulation unit configured to demodulate the OFDM symbol included in the OFDM signal frequency-converted and analog-to-digital-converted; and
   a power supply unit configured to supply power to the first and the second conversion units in the first section within the interval time of the OFDM symbol, and not to supply power to a part of the first conversion unit and a part of the second conversion unit in the second section within the interval time of the OFDM symbol.

2. The apparatus according to claim 1, wherein the first section includes a middle point of the interval time of the OFDM symbol except a guard interval, and length of the first section is predetermined.

3. The apparatus according to claim 1, wherein a middle point of the first section is identical to a middle point of interval time of the OFDM symbol except a guard interval, and length of the first section is predetermined.

4. The apparatus according to claim 1, wherein a middle point of the first section is identical to a middle point of the interval time of the OFDM symbol, and length of the first section is predetermined.

5. The apparatus according to claim 2, wherein the length of the first section is not less than ½ of interval time of the OFDM symbol except the guard interval.

6. The apparatus according to claim 1, wherein
   the power supply unit has a first mode of constantly supplying power to the first and the second conversion units and a second mode of supplying power to the first and the second conversion units in the first section and stopping supplying power to the part of the first conversion unit and the part of the second conversion unit in the second section, and switches between the first mode and the second mode; and
   the first demodulation unit demodulates a whole of the OFDM symbol when the power supply unit is in the first mode, and demodulates the OFDM symbol in the first section when the power supply unit is in the second mode.

7. The apparatus according to claim 6, wherein the power supply unit switches between the first mode and the second mode periodically.

8. The apparatus according to claim 6, further comprising:
   a symbol synchronizing unit configured to synchronize OFDM symbols included in received OFDM signals received by the antenna when the power supply unit is in the first mode.

9. The apparatus according to claim 1, further comprising:
   a measuring unit configured to measure a quality of the OFDM signal received by the antenna; and wherein the section setting unit determines length of the first section in response to the quality of the OFDM signal measured by the measuring unit.

10. The apparatus according to claim 7, further comprising:
    a measuring unit configured to measure a quality of the OFDM signal received by the antenna; and wherein the power supply unit determines a period for switching from one of the first mode and the second mode to the other in response to the quality of the OFDM signal measured by the measuring unit.

11. The apparatus according to claim 1, wherein
    the first demodulation unit includes:
    a filter-bank unit configured to frequency-convert the OFDM signal which is analog-to-digital-converted and corresponds to a third section included in the first section, length of the third section is predetermined, to obtain a plurality of filter bank outputs;
    a generation unit configured to generate, every filter bank output, a plurality of replicas from channel estimation values, frequency characteristics of the filter bank and a candidate of modulation signal of sub-carrier;
    a first selection unit configured to select one of the replicas every filter bank output, a error between the one of the replicas and the filter bank output being minimum, to obtain replicas each selected every filter bank output;
    a second selection unit configured to select a modulation signal of sub-carrier from the replicas each selected every filter bank output; and
    the first modulation unit demodulates the OFDM symbol by using the modulation signal selected.

12. The apparatus according to claim 11, wherein
    the filter bank unit extracts a plurality of third sections from the first section, to obtain the filter bank outputs every third section; and
    the first selection unit selects the one of the replicas, an average of errors each calculated between the one of the replicas and the filter bank output every third section being minimum.

13. The apparatus according to claim 1, wherein
    the first demodulation unit includes:
    a filter-bank unit configured to frequency-convert the OFDM signal which is analog-to-digital-converted and corresponds to a third section included in the first section, length of the third section is predetermined, to obtain a plurality of filter bank outputs;
    a generation unit configured to generate, every filter bank output, a plurality of replicas from channel estimation values, frequency characteristics of the filter bank and a candidate of modulation signal of sub-carriers;
    a selection unit configured to select one of the replicas every filter bank output, an error between the one of the replicas and the filter bank output being minimum
    a generation unit configured to generate a soft-decision value corresponding to each of the filter bank outputs, by subtracting, from the each of the filter bank outputs, a remaining replica component which are obtained by removing a component corresponding to the sub-carrier of an object to be demodulated from the one of the replicas selected every filter bank output, to obtain a plurality of soft-decision values corresponding to the filter bank outputs respectively; and
    the first modulation unit demodulates the OFDM symbol by using the soft-decision values.

14. The apparatus according to claim 1, wherein the first demodulation unit includes:
a filter-bank unit configured to frequency-convert the OFDM signal which is analog-to-digital-converted and corresponds to a third section included in the first section, length of the third section is predetermined, to obtain a plurality of filter bank outputs;
a generation unit configured to generate, every filter bank output, a plurality of replicas from channel estimation values, frequency characteristics of the filter bank and a candidate of modulation signal of sub-carriers;
a calculation unit configured to calculate, every filter bank output, an error between each of the replicas and the filter bank output, to obtain a plurality of errors corresponding to respective replicas;
a detection unit configured to detect, from the errors, a minimum error corresponding to a candidate of modulation signal of sub-carrier to be demodulated; and
the first demodulation unit demodulates the OFDM symbol by using the minimum error.

15. The apparatus according to claim 1, further comprising:
a second demodulation unit configured to demodulate an OFDM symbol included in another OFDM signal whose sub-carriers frequency is different from that of the OFDM signal including the OFDM symbol which is demodulated by the first demodulation unit; wherein
the power supply unit supplies power to the first and the second conversion units in the second section when the second demodulation unit demodulates the another OFDM symbol;
the first conversion unit frequency-converts the another OFDM signal received in the second section, and
the second conversion unit analog-to-digital-converts the another OFDM signal received in the second section and frequency-converted.

16. The apparatus according to claim 11, further comprising;
a modulation unit configured to modulate an OFDM signal; and
a third conversion unit configured to digital-to-analog-convert the OFDM signal modulated; wherein
the power control unit supplies power to the first conversion unit in the second section when the ODFM signal modulated and digital-to-analog-converted is transmitted;
the first conversion unit frequency-converts the OFDM signal modulated and digital-to-analog-converted; and
the antenna transmits the OFDM signal that is modulated, digital-to-analog-converted and frequency-converted.

17. The apparatus according to claim 1, wherein
the power supply unit supplies power to a bias circuit included in the first conversion unit and stops supplying power to a transistor circuit included in the first conversion unit, in the second section.

18. The apparatus according to claim 1, wherein
the power supply unit supplies power to a bias circuit of a low noise amplifier (LNA) included in the first conversion unit and stops supplying power to a transistor circuit of the LNA, in the second section.

19. An orthogonal frequency division multiplex (OFDM) signal receiving method applied to a signal receiving apparatus which includes
an antenna receiving the OFDM signal including an OFDM symbol;
a first conversion unit configured to frequency-convert an OFDM signal received by the antenna; and
a second conversion unit configured to analog-to-digital-convert the OFDM signal frequency-converted, the method including:
setting a first section to be modulated in an interval time of the OFDM symbol and a second section that is other than the first section in the interval time of the OFDM symbol, wherein a length of the first section is shorter than the interval time of the OFDM symbol;
frequency-converting, by the first conversion unit, the OFDM signal received by the antenna;
analog-to-digital-converting, by the second conversion unit, the OFDM signal frequency-converted;
supplying power to the first and the second conversion units in the first section within the interval time of the OFDM symbol;
stopping supplying power to a part of the first conversion unit and a part of the second conversion unit in a second section within the interval time of the OFDM symbol; and
demodulating the OFDM symbol which is in the first section, frequency-converted and analog-to-digital-converted.

* * * * *